July 14, 1970     G. K. HAUSE ET AL     3,520,213
DIFFERENTIAL DRIVE AXLE
Filed Oct. 31, 1968     2 Sheets-Sheet 1
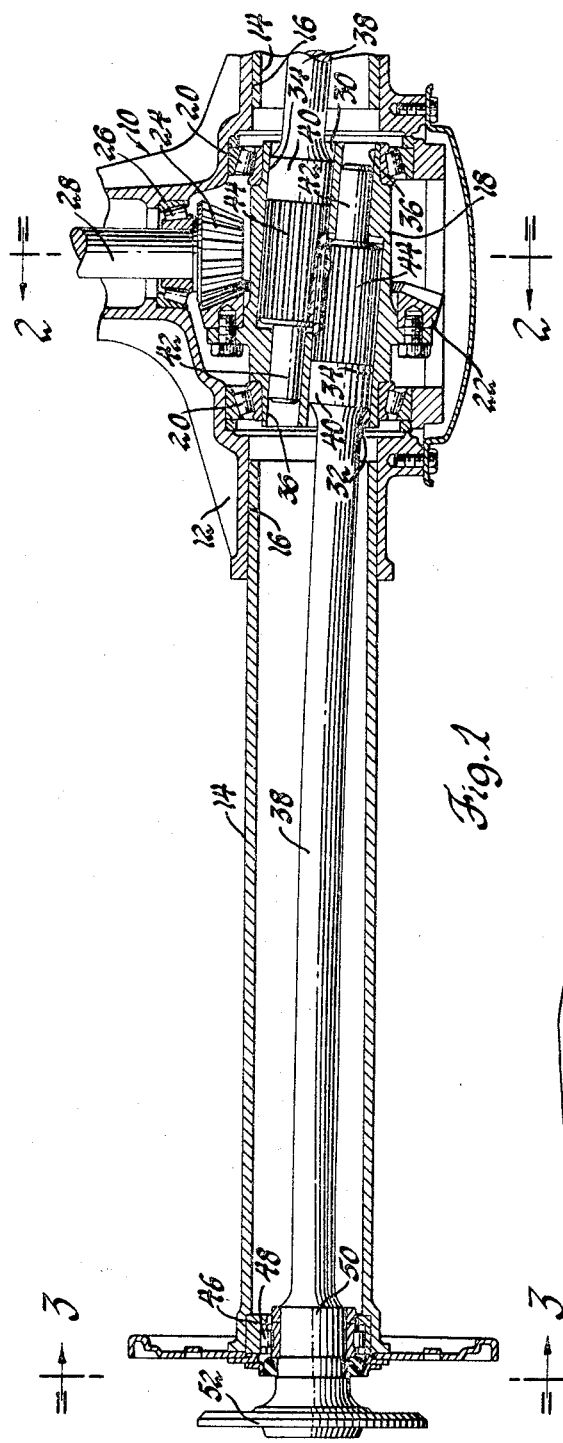
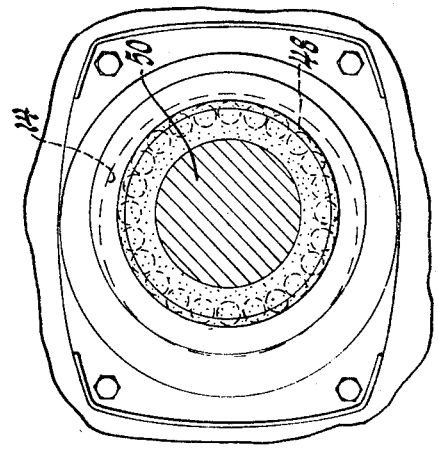
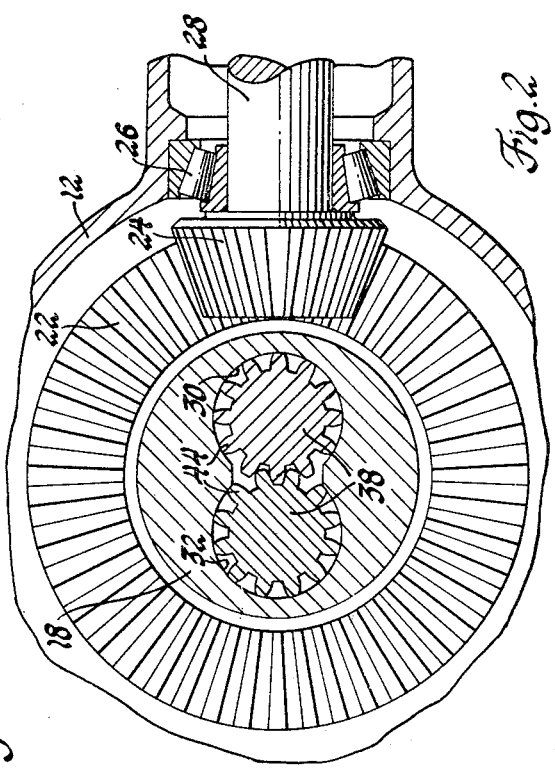
INVENTORS
Gilbert K. Hause, &
BY Clifford C. Wrigley
Robert J. Outland
ATTORNEY

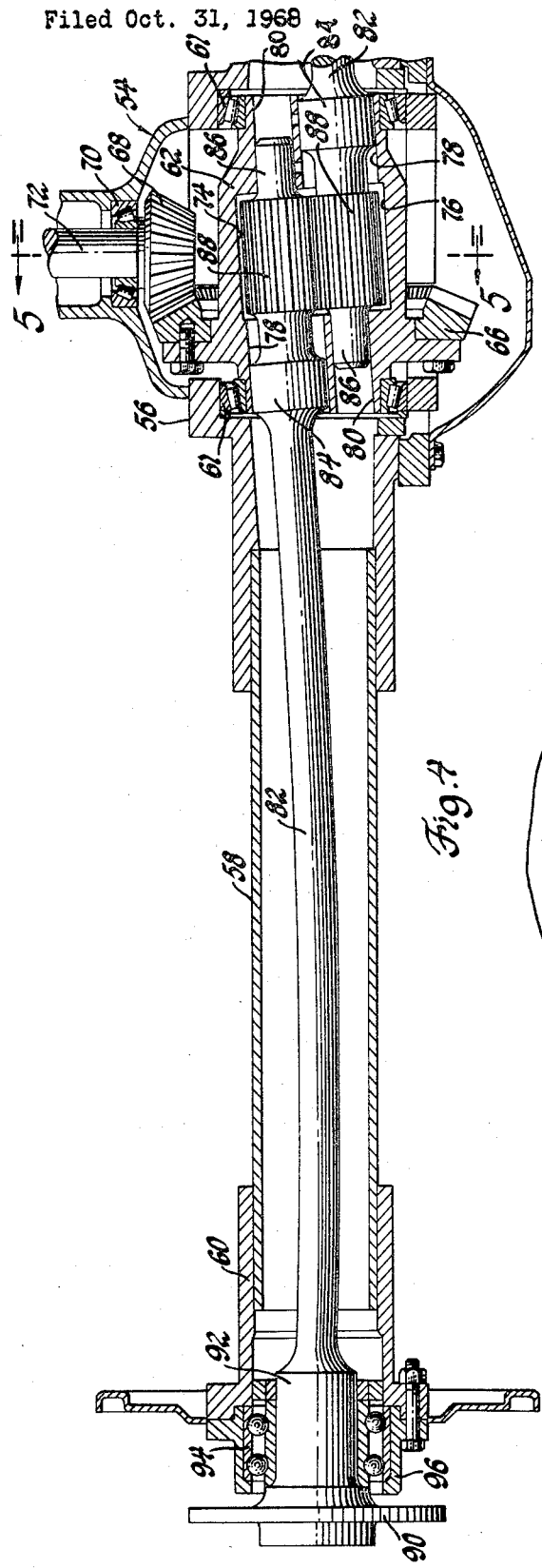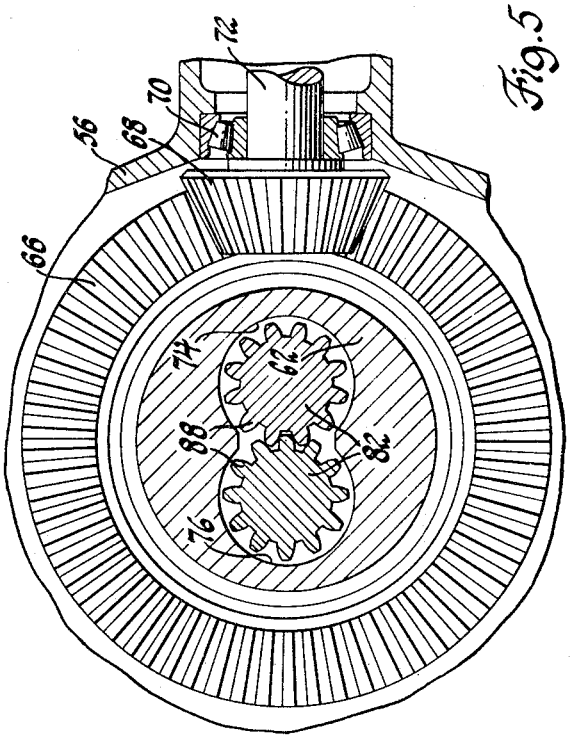

United States Patent Office 3,520,213
Patented July 14, 1970

3,520,213
DIFFERENTIAL DRIVE AXLE
Gilbert K. Hause, Bloomfield Hills, and Clifford C. Wrigley, Grosse Pointe Woods, Mich., assignor to General Motors Corporation, Detroit, Mich., a corporation of Delaware
Filed Oct. 31, 1968, Ser. No. 772,104
Int. Cl. F16h 1/42
U.S. Cl. 74—714        10 Claims

ABSTRACT OF THE DISCLOSURE

In preferred embodiments, differential drive axles each having a pair of angularly disposed differential gears carried within a rotatable case and formed integrally with outwardly extending flexed drive axles. The flexed axles are supported at their outer ends by bearing members which fix the positions of the outer ends on rotational axes common with one another and with the differential case. Both single and double row outer bearings are disclosed which created different flexure conditions and resultant load conditions in the respective axle shafts.

FIELD OF THE INVENTION

This invention relates to differential drive axles and more particularly to simplified differential and axle constructions especially, but not exclusively, adapted for use in motor vehicles.

DESCRIPTION OF THE PRIOR ART

It is known in the art relating to vehicle drive axles to provide simplified differential gearing comprising two differential gears rotatably carried in toothed engagement for rotation on parallel axes within a differential case which is in turn rotatably supported in a carrier and arranged to be driven by a source of power. The differential gears are each connected with or formed as a part of a drive axle with the axes of the gears and axle being parallel with one another but forming an angle with the rotational axis of the differential case. In such arrangements, some type of universal joint connection is provided at the outer ends of the axle shafts to connect the axles with the vehicle wheels. Alternatively, the vehicle axles may be arranged for rotation on a common axis with the differential case and in such instances, universal joint means are provided between the inner ends of the axles and the differential gears to compensate for the angular difference in their axes of rotation.

SUMMARY OF THE INVENTION

The present invention provides simplified differential and axle constructions which utilize the principle of angularly offset differential gears to simplify the differential construction and further dispense with the need for universal joint connections between the differential gears and the vehicle wheels by employing novel flexed axle arrangements.

In one particular form of the invention, a single row bearing is used at the outer end of each axle shaft which cooperates with bearings in the differential case to retain the shaft in a parabolically flexed condition in which it is subject, as are conventional axles, to the additional bending forces applied through the loads imposed on the axle by the vehicle wheels. An alternative, but slightly more expensive arrangement, provides for the use of a double row bearing at the outer end of each axle shaft which in cooperation with the differential case applies a bending moment to maintain the shaft in an arcuately flexed condition to provide for minimum shaft stresses. This arrangement also absorbs bending forces from the vehicle wheels in the outer bearing members so that such forces are not applied to the axle shafts.

These and other advantages of the invention will be more apparent from the following description of the preferred embodiments of the invention taken together with the accompanying drawings.

BRIEF DESCRIPTION OF THE DRAWINGS

In the drawings:
FIG. 1 is a fragmentary cross-sectional view of one embodiment of a differential axle assembly according to the invention;
FIG. 2 is a cross-sectional view of the differential portion taken generally in the plane indicated by the line 2—2 of FIG. 1;
FIG. 3 is a cross-sectional view of the outer end of the axle assembly taken generally in the plane indicated by the line 3—3 of FIG. 1;
FIG. 4 is a fragmentary cross-sectional view of an alternative embodiment of differential axle shaft assembly according to the invention; and
FIG. 5 is a cross-sectional view of the differential portion taken in the plane indicated by the line 5—5 of FIG. 4.

DESCRIPTION OF THE PREFERRED EMBODIMENTS

Referring now to the drawings in detail, FIGS. 1 through 3 illustrate a differential drive axle assembly generally indicated by the numeral 10. Axle assembly 10 includes an axle housing made up of a cast differential carrier 12 having a pair of flanged tubes 14 retained in oppositely disposed openings 16 of the carrier and extending oppositely outwardly therefrom.

Within the carrier 12, a differential case 18 is rotatably supported by roller bearings 20 for rotation on an axis fixed with respect to the axle housing. The case 18 carries a detachable ring gear 22. Ring gear 22 engages a pinion gear 24 which is supported by a bearing 26 and connects with a shaft 28 provided with means (not shown) for connecting the pinion gear with a source of power through means such as a vehicle drive shaft.

Differential case 18 includes a pair of transversely extending openings 30 and 32 formed on spaced parallel axes disposed at an angle with respect to the axis of the case 18. The openings 30, 32 each include oppositely directed large diameter portions 34 connecting, at their opposite ends, with smaller diameter portions 36. The large diameter portions 34 overlap one another in the central portion of the differential case so as to connect the two openings 30, 32.

Within openings 30, 32 are received the inner ends of a pair of axle shafts 38. These inner ends are journaled for rotation on the axes of their respective openings on inner bearing portions 40 received in the large diameter portions 34 of openings 30, 32 and outer bearing portions 42 received in the smaller diameter portions 36 of openings 30, 32. Intermediate the inner and outer bearing portions 40, 42 of each shaft teeth are formed to provide differential gears 44 which engage one another through the connecting portions of the openings 30, 32 so as to provide for equal and opposite relative rotation of the two axle shafts. While the gears and bearing portions of the axle shafts are formed integrally therewith in the disclosed embodiment, it should be apparent that these elements could be formed separately and attached to the axle shafts by other means if desired.

At the outer ends of the flanged axle tubes 14, there are provided bearing supporting members 46 which retain single row roller bearings 48 engaging and supporting the axle shafts 38 at enlarged portions 50 adjacent their outer ends. Outboard of portions 50, the shafts are provided with conventional flanges 52 to which vehicle wheels may be secured in a conventional manner.

In the described arrangement, the bearings 48 cooperate with the larger and smaller diameter portions 34, 36 of the case 18 so as to maintain axle shafts 38 in a parabolically flexed condition. To accomplish this the case portions 34, 36 comprise bearing surfaces which apply bending moments at the inner ends of the axle shafts while the single row bearings 48 apply bending forces at the shafts outer ends, these later forces being unidirectional at any one instant but, obviously, rotating with the rotation of the axle shafts.

The bearing support means 46 cause the bearings 48 to be slightly offset in the axle tubes 14 so that the outer ends of the axle shafts rotate on a common axis parallel to but slightly offset from the axis of the axle tubes 14. The rotational axis of case 18 is likewise common with that of the outer axle portions 50 and offset from that of the axle tubes 14. This offsetting provides clearance for the initial installation of the axles partially into the differential case before they are flexed to complete the installation of the outer ends within the bearings 48.

While this embodiment has the particular advantage that a relatively inexpensive single row ball or roller bearing may be used to support the outer axle ends, it does not take full advantage of the flexing capabilities of the axle shafts, since the application of bending moments only at the inner ends of these shafts causes the bending stresses to be highest adjacent the inner ends and to reduce to zero at the outer ends supported by the bearings 48.

If desired, it is possible to provide an alternative construction utilizing a somewhat more expensive double row bearing at the outer ends of the axle shafts so as to introduce bending moments there as well as the inner ends and thus permit maintaining the axle shafts in arcuately flexed conditions which give equal bending stresses over their entire lengths. This permits a greater degree of bending of the shafts without increasing the maximum stresses and further provides for the absorption of wheel loads in the outer bearings so that bending forces from these loads are not applied to the axle shafts.

Such an alternative construction is disclosed in the embodiment of FIGS. 4 and 5 which illustrate a differential drive axle assembly generally indicated by numeral 54.

Drive axle 54 comprises an axle housing made up of a fabricated differential carrier 56 connected with a pair of oppositely extending axle tubes 58 (only one being shown), the tubes having flanged retainer members 60 secured to the outer ends thereof. Within the carrier 56 there is rotatably supported on bearings 61 a differential case 62 arranged for rotation on an axis fixed with respect to the axle housing and carrying a ring gear 66 which engages a pinion 68. The pinion 68 is supported on bearings 70 and is connectable through a shaft 72 with a source of power.

The differential case 62, similar to that of the previously described embodiment, includes a pair of transversely extending openings 74, 76 formed on spaced parallel axes disposed at an angle to the axis of the case 62. The openings 74, 76 each include oppositely opening large diameter portions 78 connected at their opposite ends with smaller diameter portions 80. In the central portion of the differential case, the openings 74, 76 are slightly more enlarged than at their large ends and overlap one another so as to connect the two openings.

The inner ends of a pair of axle shafts 82 are received within the case openings 74, 76 and include inner bearing portions 84 received within the large diameter portions 78 of openings 74, 76 and outer bearing portions 86, smaller in diameter than portions 84, and received within the smaller diameter portions 80 of openings 74, 76. As in the first described embodiment, these inner and outer bearing portions journal the shafts inner ends for rotation on the axes of their respective case openings. Intermediate the inner and outer bearing portions 84, 86 differential gear portions 88 are integrally formed on the shafts although they could be separately formed and secured to the shafts if desired. Gears 88 engage one another through the overlapping portions of openings 74, 76 so as to positively connect the two axle shafts 82 for equal and opposite differential rotation with respect to one another.

At their outer ends, axle shafts 82 carry flanged portions 90 to which a vehicle wheel may be attached. Inboard of the flanged portions, enlarged portions 92 of the shafts are provided which are rotatably supported by double row ball bearings 94 retained in bearing retainers 96 which are secured to the flanged ends of retainer members 60. Ball bearings 94 maintain the outer ends including enlarged surfaces 92 of the axle shafts 82 in fixed positions having a rotational axis common with one another and with the rotational axis of the differential case 62. In this instance, this axis is also common or coaxial with that of the axle tubes 58.

The use of the double row bearings 94 permits bending moments to be applied to the outer ends of the axle shafts so that the shafts may be and preferably are maintained in an arcuately flexed condition having equal bending stresses occurring throughout their lengths intermediate the portions 92 and 84. As previously mentioned, this permits a greater angularity to exist between the rotational axes of the outer ends of the axle shafts and the associated differential gears on their inner ends without reaching the maximum stress limits of the axle shafts. In addition, the double row bearings 94 absorbs all thrust loads from the vehicle wheels and prevents their imposition as additional bending loads on the axle shafts.

While the invention has been described by reference to certain preferred embodiments, it should be apparent that numerous changes could be made in the concepts disclosed without departing from the spirit and scope of the invention. If desired, for example, a double row bearing might be used as in the embodiment of FIGS. 4 and 5 but combined with a single bearing to support the inner ends of the axle shafts within the differential case, in which instance, the shafts would be parabolically flexed with the greater bending stress existing adjacent the outer bearings in a manenr opposite to that of the embodiment of FIGS. 1–3. These and other changes which might be made within the scope of the invention are intended to be included within the inventive concept as defined by the following claims.

What is claimed is:

1. Differential drive means for the delivery of power from a rotatable drive member to a pair of rotatable driven members, said drive means comprising
 a differential case rotatable on a predetermined axis and connectable with said drive member for rotation thereby,
 a pair of differential gears in engagement with one another and rotatably carried in said case for rotation on parallel axes disposed at an angle with the axis of said case,
 a pair of output shafts, one connected with each of said differential gears and extending axially thereof, said shafts being interconnected by said gears and extending oppositely for connection at spaced locations with said rotatable driven members, and
 means supporting said output shafts and maintaining them in a resiliently flexed condition such that the outer ends of the shafts are maintained for rotation on a common axis with one another and with said differential case,
 the inner ends of said shafts being constrained to orbit about said common axis upon rotation of said differential case and to differentially rotate on their respective parallel axes in response to action of the differential gears.

2. The combination of claim 1 wherein said supporting means for the output shafts comprise a pair of spaced bearing means in said differential case for each of said output shafts, said bearing means cooperating to apply a bending moment to the inner end of each of said shafts.

3. The combination of claim 2 wherein said supporting means for the output shafts further comprise bearing means at the outer ends of said shafts and arranged to apply a undirectional bending force to their respective shafts whereby said shafts are maintained in a generally parabolically flexed condition, said shafts being subject to additional bending forces applied thereto through said rotatable driven members.

4. The combination of claim 2 wherein said supporting means for the axle shafts further comprise bearing means arranged at the outer ends of each of said shafts and arranged to apply bending moments to their respective shafts whereby said shafts are maintained in an arcuately flexed condition and are protected from the imposition of additional bending forces.

5. A drive axle assembly for a vehicle, said assembly comprising
an axle housing including an enlarged central portion and a pair of tubular portions extending oppositely from said central portion,
a pinion gear rotatably carried in said central portion and adapted to be connected to a source of power,
a differential case rotatably carried in said central portion and including a ring gear engaging said pinion gear for rotatably driving said case, said case having an axis extending generally lengthwise of said tubular portions,
a pair of axle shafts carrying differential gears adjacent their inner ends and having their inner ends received in said case with the gears in engagement with one another, the inner ends of said shafts being rotatable in said case on parallel axes formed at an angle with respect to the axis of said case and said case being arranged to apply a bending moment to each of said axle shafts inner ends,
bearing means in the outer ends of said tubular portions journaling the outer ends of said axle shafts for rotation coaxially with said differential case, said bearing means being arranged to apply a bending force to each of said axle shafts so as to maintain said shafts in a flexed condition at all times.

6. The axle assembly of claim 5 wherein said differentials gears are formed integral with said axle shafts, said shafts further including inner and outer bearing portions located on opposite sides of said gears.

7. The axle assembly of claim 5 wherein the bending force applied by said bearing means to said axle shafts is unidirectional at any one instant whereby said axle shafts are maintained in a parabolically flexed condition and said shafts are subject to bending moments applied thereto from the outer ends thereof.

8. The axle assembly of claim 7 wherein said bearing means comprise a rolling element bearing assembly for each shaft, each said bearing assembly having only a single row of rolling elements.

9. The axle assembly of claim 5 wherein said bearing means are arranged to apply a predetermined bending moment to the outer end of each of said shafts so as to maintain it in an arcuately flexed condition and to prevent the transmission of additional bending moments to the flexed portions of each said shaft from the outer end thereof.

10. The axle assembly of claim 9 wherein said bearing means comprise a double row of rolling bearing elements spaced axially of each said shaft at its outer end.

References Cited

UNITED STATES PATENTS

| | | | |
|---|---|---|---|
| 1,138,900 | 5/1915 | Simth | 74—714 |
| 1,149,985 | 8/1915 | Proud | 74—714 |
| 1,305,030 | 5/1919 | Tibbetts | 74—714 |
| 2,120,636 | 6/1938 | Trbojevich | 74—715 X |
| 3,241,388 | 3/1966 | Galaniut | 74—714 |

DONLEY J. STOCKING, Primary Examiner

T. C. PERRY, Assistant Examiner